United States Patent Office 3,419,566
Patented Dec. 31, 1968

3,419,566
HYDROXY-ALKOXY, ALKYL QUATERNARY
AMMONIUM SULFONES
Andrew Oroszlan, Elmhurst, and Giuliana C. Tesoro, Dobbs Ferry, N.Y., assignors to J. P. Stevens & Co., Inc., New York, N.Y., a corporation of Delaware
No Drawing. Filed Jan. 8, 1962, Ser. No. 165,017
4 Claims. (Cl. 260—294.8)

This invention relates to a method of stepwise modifying polymeric materials with a polyfunctional reactant in which the functional groups have different reactivity, and to the resulting modified materials so produced; and, more particularly, to a method of cross-linking polymeric materials with the aforementioned polyfunctional reactant wherein one functional group reacts with the polymeric material under one set of reaction conditions and a second functional group reacts subsequently with the material under a different set of reaction conditions, and to the cross-linked materials so produced. The invention further relates to a new and improved group of polyfunctional reactants and the method of making the same.

The modification of polymeric materials to improve particular properties by treating the materials with a polyfunctional reactant is well known. One example is the cross-linking of linear polymers to form a three-dimensional network. Thus, cellulosic textiles have been cross-linked with polyfunctional sulfones, epoxides, N-methylol amides, and the like, in order to modify the properties of the textiles, including those of dimensional stability, resilience, flat-drying, and the like, which properties are not possessed by the textiles in the unmodified state. All of the cross-linking reagents which have been used to date have similar functional groupings, and thus, while the cross-linking process does permit some control of the extent and rate of the reaction by adjusting concentrations, catalysts, temperatures, and the like, it is generally impossible to exercise sufficient control over the cross-linking reaction because the reactive groups combine with the polymer at similar rates, and a three-dimensional network is formed.

A disadvantage with the modification of polymeric materials, such as the cross-linking of cellulosic textiles to improve their properties, is that the modification must generally be carried out as a last step or treatment to which the polymeric material is subjected. For example, if the cellulosic fibers are cross-linked prior to conversion to yarn, or yarns prior to conversion to fabrics, or even fabrics prior to dyeing, serious difficulties are encountered in subsequent processing steps. If a cellulose solution (e.g., "viscose") is reacted with a polyfunctional cross-linking agent, the resulting gel can no longer be spun into fiber by conventional and most economical means. If cellulosic fibers are cross-linked by reacting with a cross-linking agent, their elongation at the breaking point is severely reduced and the resulting fibers therefore difficult to spin into yarns. Because of the foregoing difficulties, the cross-linking modification of the fibers is usually carried out as a final step after the end product, such as the textile fabric, has been formed, and usually after the dyeing of the fabric. Also, because of the foregoing difficulties, the usefulness of the cross-linking processes is limited, their scope restricted, and the modification of the cellulosic fibers must be carried out by the fabric finishers and not by the fiber manufacturers, as would be desirable in some instances.

Accordingly, it is an object of this invention to obviate the present disadvantages and limitations existing in the use of known modifying or cross-linking agents for polymers.

It is an object of this invention to provide a process for modifying polymeric materials containing active hydrogen atoms by first reacting the materials at any stage of their manufacture with one reactive group of an unsymmetrical, polyfunctional modifying agent, in order to attach the agent to the materials and subsequently during the same or different stage of manufacture, reacting another but different reactive group of the agent with an active hydrogen atom of the material so as to effectively cross-link the material and thus modify its properties. For the purpose of the following specification and claims, we define as "active hydrogen" any reactive hydrogen atom which is capable of being added to, being replaced by, or entering into reaction with the functional group of the reagent employed.

It is a further object of this invention to provide a process for modifying polymeric materials having active hydrogen atoms by reacting the materials with an unsymmetrical modifying agent having functional groups of different reactivity on the molecule, wherein one functional group reacts with an active hydrogen of the polymeric material under one set of reaction conditions and the other reactive group reacts with an active hydrogen of the polymeric material under a different set of reaction conditions.

It is another object of this invention to provide a process for modifying polymeric materials containing active hydrogen atoms by reacting the materials with a modifying agent containing polyfunctional unsymmetrical reactive groups which react at widely different rates under the same reaction conditions whereby one functional group is first attached to the polymeric material and subsequently, the second functional group is attached to the polymeric material to effectively cross-link the polymeric material and thus modify its properties.

It is another object of this invention to provide a process for imparting desirable properties to cellulosic fabrics including improved wet and dry crease recovery properties by the stepwise reaction of an unsymmetrical bifunctional cross-linking agent with the cellulosic fibers at any stage of fiber processing.

Another object of the invention is to provide a polymer having an unsymmetrical bifunctional cross-linking agent attached thereto as the result of reaction between an active hydrogen atom of the polymer and one of the functional groups of the agent whereby the physicomechanical properties of the polymer, such as a cellulosic material, remain substantially the same as those of an untreated polymer, and the change in properties does not occur until the other functional group of the cross-linking agent is reacted with another active hydrogen atom of the polymer and the agent becomes in effect a cross-link.

It is another object of this invention to provide new and useful polyfunctional cross-linking agents for treating polymeric materials including cellulosic materials.

Another object of this invention is to provide processes for forming the aforesaid new and useful polyfunctional cross-linking agents.

A further object of this invention is to provide polymeric materials having an unsymmetrical polyfunctional compound attached thereto by the reaction of one functional group with an active hydrogen of the material, which treated polymeric material is capable of further and subsequent reaction between the remaining functional groups and other hydrogen atoms of the material whereby the properties of the material may be modified by such subsequent reaction.

It is a further object of this invention to provide a method of cross-linking cellulosic fibers by treating the cellulosic material with a bifunctional compound under one set of reaction conditions wherein one functional group of the compound reacts with the cellulosic material, and subsequently subjecting the treated cellulosic material to a different set of reaction conditions wherein the second functional group of the compound reacts with the cellulose to modify the properties of the cellulosic material.

In attaining the objects of this invention one feature resides in modifying a polymeric material containing active hydrogen atoms by reacting the material with an unsymmetrical bifunctional modifying agent having one functional group reacting with the active hydrogen atoms of the polymeric material under exceedingly mild conditions and the other reactive group entering into reaction with the active hydrogen atoms when heated to a temperature of at least 100° C. in the presence of a suitable catalyst. Alternatively, one functional group of the reagent can be inert under alkaline conditions and react with the active hydrogen atoms of the polymeric material under acidic conditions, while the second functional group reacts under alkaline conditions, so that a stepwise reaction can be achieved by providing acidic and alkaline conditions of catalysis in separate steps.

A specific feature resides in having the unsymmetrical polyfunctional cross-linking agent of the invention contain at least one reactive group which is a vinyl sulfone donor and is reactive at ambient temperatures with the active hydrogen atoms of cellulose and in having the cross-linking agent contain another reactive group which is an oxyethyl group which reacts at higher temperatures, so that substantially complete control over the modification process can be achieved.

Other objects, features, and advantages of the invention will be more apparent from the following disclosure of the invention.

To modify or cross-link polymers having active hydrogen atoms, the polymers are reacted with an unsymmetrical polyfunctional compound of the formula $$X—Q—Y$$

wherein Q is an organic radical, X is a functional group and Y is a functional group which differs from X in structure and reactivity. The reaction takes place under conditions whereby only one functional group reacts with an active hydrogen of the polymer, and subsequently the treated polymer is subjected to a set of reaction conditions wherein the other functional group of the compound reacts with still another active hydrogen of the polymer. When the polymer is a cellulosic material, the compound X—Q—Y can be attached to the cellulose molecules by reaction of the functional group X with the hydrogen in a hydroxyl group of the cellulose molecule under a particular set of reaction conditions. To cross-link the cellulosic material, the treated material is subjected to the particular reaction conditions which enable the functional group Y to react with an active hydrogen of the cellulose molecules. Alternatively, the reaction conditions may be the same but X and Y have the properties of reacting at widely different rates under such conditions.

It has been found that excellent results are obtained when a polymeric material having active hydrogen atoms is treated with an unsymmetrical, difunctional modifying agent having the formula:

(I) $\quad ROCH_2CH\underset{R'}{—}A'(Z—A')_n—R''$ in which (a) R is selected from the group consisting of hydrogen, lower alkyl and lower acyl,
(b) R' is selected from the group consisting of hydrogen and lower alkyl,
(c) A' is selected from the group consisting of

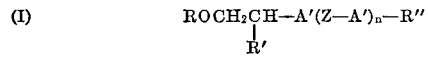

(d) Z is a bivalent organic radical selected from the group consisting of alkylene, aralkylene, the residue of a diamine

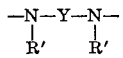

in which Y is a divalent organic radical and R' has the same definition as above, and the residue of a heterocyclic diamine

in which the two nitrogen atoms are part of the heterocyclic ring D, (e) n is either 0 or 1,
(f) R'' is a member selected from the group consisting of (1) 

(2) 

in which A is selected from the group consisting of a polar residue derived from a reagent of weak nucleophilic character and the aziridinyl residues

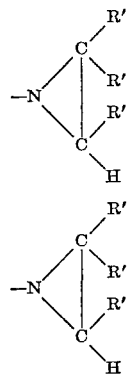

and (3)

where R' in each of the formulas has the meaning defined above, namely, a member selected from the group consisting of hydrogen and lower alkyl.

Representative compounds coming within the definition of Formula I include $CH_3OCH_2CH_2SO_2CH=CH_2$

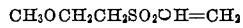

$C_2H_5OCH_2CH_2COOCH=CH_2$ $CH_3OCH_2CH_2COCH=CH_2$

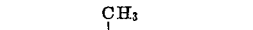

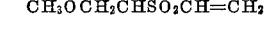

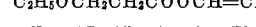

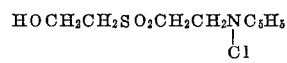

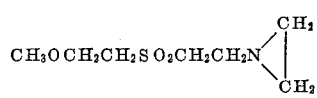

$CH_3OCH_2CH_2COHNCH_2NHCOCH=CH_2$

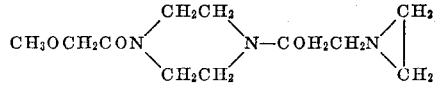

CH₃OCH₂CH₂SO₂NHCH₂CH₂NHSO₂CH=CH₂
CH₃OCH₂CH₂COCH₂COCH=CH₂
CH₃COOCH₂CH₂SO₂CH=CH₂

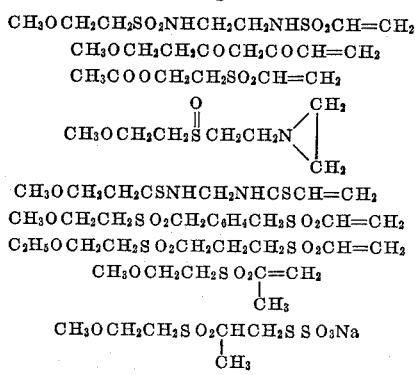

CH₃OCH₂CH₂CSNHCH₂NHCSCH=CH₂
CH₃OCH₂CH₂SO₂CH₂C₆H₄CH₂SO₂CH=CH₂
C₂H₅OCH₂CH₂SO₂CH₂CH₂CH₂SO₂CH=CH₂

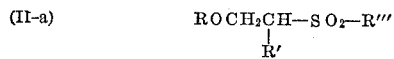

Other compounds, particularly those wherein Z is any one of a large number of alkylenes, aralkylenes, and diamine residues, will be apparent to those skilled in the art as being satisfactory cross-linking agents for the process of the invention.

It has been further found that a polymeric material having active hydrogen atoms, such as a cellulosic material, can also be modified by treating it with the new and novel sulfone and sulfonamide compounds of the invention having the formula (II)      ROCH₂CH—SO₂(Z—SO₂)ₙ—R″
              |
              R′ wherein R, R′ and R″, Z and n have the same definitions as in Formula I.

Furthermore, excellent results have been obtained with new and novel sulfone compounds having the formula (II-a)      ROCH₂CH—SO₂—R‴
               |
               R′ wherein R and R′ have the same definition as above and R‴ is a member selected from the group consisting of —CH=CH₂ and —CH₂CH₂A wherein A is a member selected from the group consisting of a polar residue derived from a reagent of weak nucleophilic character and an aziridinyl group having the formula

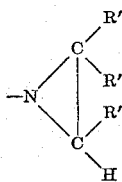

where R′ has the same definition as above.

Best results occur when the lower alkyl groups referred to in the aforesaid Formulas I and II, or which form a part of the lower acyl group, contain 1–6 carbon atoms and, preferably, when they contain from 1–4 carbon atoms.

Among the polar residues A which can be present in the compounds represented by the Formulas I and II as well as II–a are groups derived from reagents of weak nucleophilic character. More specifically, the polar residues are selected from the group consisting of the anion of a strong acid (ionization constant $>10^{-5}$) and the cation of a weak base (ionization constant $<10^{-5}$).

Specific examples of A are the following: When A is the anion of a strong acid:

—OSO₃M sulfate residue where M is selected from the group consisting of alkali and ammonium
—SSO₃M thiosulfate residue, where M has the same meaning as above
—OCOCH₃ acetate residue, and the like.

When A is the cation of a weak base:

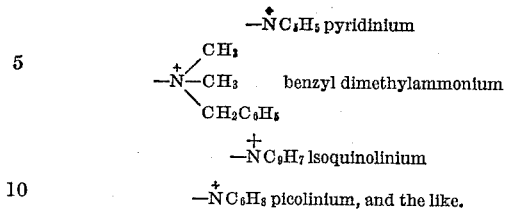

—ṄC₉H₇ isoquinolinium

—ṄC₆H₈ picolinium, and the like.

Nucleophilic character is defined as the tendency to donate electrons or share them with a foreign atomic nucleus. (Gilman, "Organic Chemistry," second edition, vol. II, p. 1859.)

The reaction of the new unsymmetrical compounds with cellulosic fibers is significant since processes for crosslinking the cellulose molecules impart many highly desirable properties to textile materials manufactured from cellulosic fibers. The present invention will be illustrated by the reaction of the unsymmetrical sulfones of the above formulas with cellulosic materials, including cotton fabrics and regenerated cellulosic fabrics, although it must be understood that the compounds of generic Formula I can be used as "stepwise" modifying or cross-linking agents for all polymeric materials containing a plurality of active hydrogen atoms per polymeric molecule, both cellulosic and non-cellulosic, which polymeric materials include natural fibrous polymers such as cellulose, wool, silk, and the like; synthetic fibrous polymers such as polyamides, polyvinyl alcohol fibers, and the like; natural non-fibrous materials such as starch, gelatin, and the like; and synthetic non-fibrous polymers such as polyvinyl alcohol resin, polypeptides, and the like. It is to be further understood that the aforesaid polymeric materials having active hydrogen atoms may be reacted at any stage of their development—including as solutions, as fibers, as yarns, as textile fabrics and the like—with one of the functional groups of the modifying agent, and, subsequently, at another stage of development, the treated polymeric material is reacted under conditions such that another different functional group of the modifying agent reacts with the polymeric material so as to effect a cross-linking of the polymers and the formation of a three-dimensional network of polymers joined or cross-linked by the modifying agent. Thus, the unsymmetrical polyfunctional modifying agent can be attached by one of the functional groups to the polymeric material in fiber form and, after the fiber has been converted to yarns and subsequently to a fabric, the fabric may be subjected to the proper reaction conditions which permit the other functional group on the modifying agent to react with an active hydrogen on the fabric polymer and effect cross-linking, thus modifying the properties of the fabric. As is apparent from the above, it is necessary that the material being treated include polymers having active hydrogen atoms and thus the process of the invention is also applicable to blends of polymeric materials containing the active hydrogen atoms with materials having no active hydrogens, including fabrics made from a blend of two or more fibrous polymers.

Included among the novel compounds of Formula I are those having the formula (III)      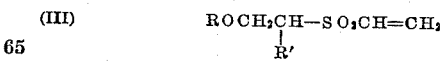

in which R is selected from the group consisting of hydrogen, lower alkyl and lower acyl, and R′ is selected from the group consisting of hydrogen and lower alkyl; and (IV)      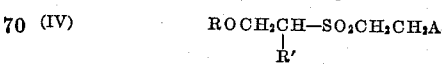

in which R and R′ have the same definition as shown above and A is selected from the group consisting of a polar residue derived from a reagent of weak nucleophilic character, such as the cation of a weak base (e.g., —NC₅H₅, pyridinium) or the anion of a strong acid (e.g., —SSO₃Na, thiosulfate; —OSO₃Na, sulfate) as described above, and aziridinyl radicals.

The compounds shown in Formulas III and IV are characterized by the presence of the beta-oxyethyl sulfone grouping which is capable of entering into reaction with active hydrogen atoms only under essentially anhydrous conditions and at elevated temperatures. They are further characterized by the presence of the vinyl sulfone grouping (Formula III) and the corresponding saturated derivative grouping ACH₂CH₂SO₂— (Formula IV) which are capable of entering into reaction with active hydrogen atoms in the presence of water and at ambient temperature. These new compounds can be attached to polymers containing active hydrogen atoms, as shown in the following equations wherein the symbol Pol-H is used to designate a polymer molecule containing a plurality of active hydrogen atoms.

presence of a suitable catalyst. Thus, as will be readily apparent, cross-linking of polymeric chains can be carried out on the modified polymer at any desired time.

The compounds corresponding to Formulas III and IV in which R and R' are hydrogen can be prepared by the following reactions:

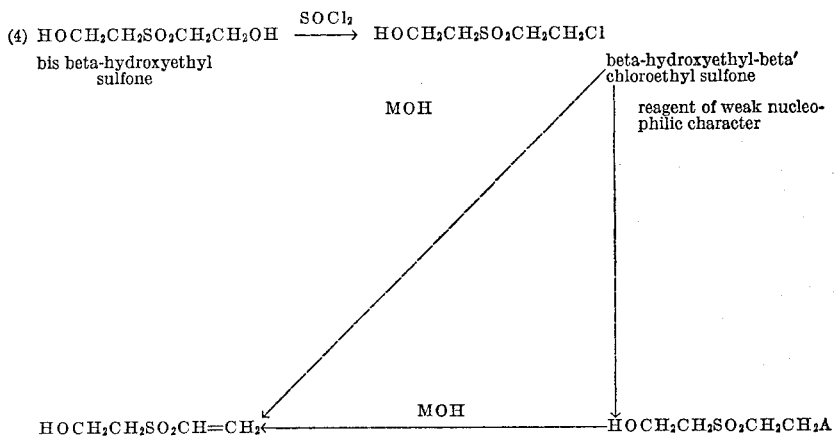

A represents the residue derived from a reagent of weak nucleophilic character. MOH is preferably an alkali metal hydroxide, but any alkaline compound having a dissociation constant greater than about 10⁻⁵ will be satisfactory in the aforesaid reaction.

As is evident from the foregoing equation, the bis-beta-hydroxyethyl sulfone in the presence of SOCl₂ is converted to beta-hydroxyethyl-beta' chloroethyl sulfone. When the latter compound is reacted with a reagent having a weak nucleophilic character, such as an alkali metal thiosulfate, the following compound is formed:

(V)         HOCH₂CH₂SO₂CH₂CH₂SSO₃Na

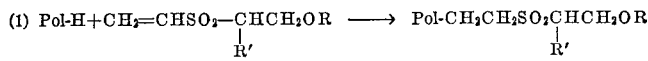

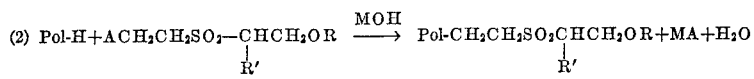

In the second reaction, MOH represents an alkali metal hydroxide, such as sodium hydroxide or a basic compound of equivalent strength.

The reactions illustrated by the foregoing equations can be carried out at ambient temperature in the presence of water under conditions which do not remove or affect the beta-oxyethyl sulfone grouping. Such polymeric reaction products can be converted to end products which can be cross-linked at any desired stage of processing by effecting reaction of the beta-oxyethyl sulfone with unreacted polymer molecules as shown in the following equation:

When the beta-hydroxyethyl-beta' chloroethyl sulfone is reacted with pyridine, it forms a pyridinium chloride derivative, having the following formula:

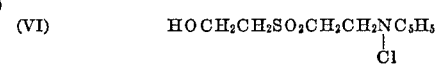

Likewise, the beta-hydroxyethyl-beta' chloroethyl sulfone can be reacted with other compounds to convert it to other saturated derivatives of polar character.

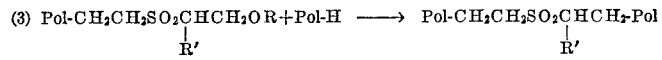

The foregoing reaction takes place when the polymeric product is heated to a temperature of about 100° C. in the The compounds corresponding to Formulas III and IV in which R is the lower alkyl or lower acyl group and R' is hydrogen or lower alkyl, can be prepared by the following reactions:

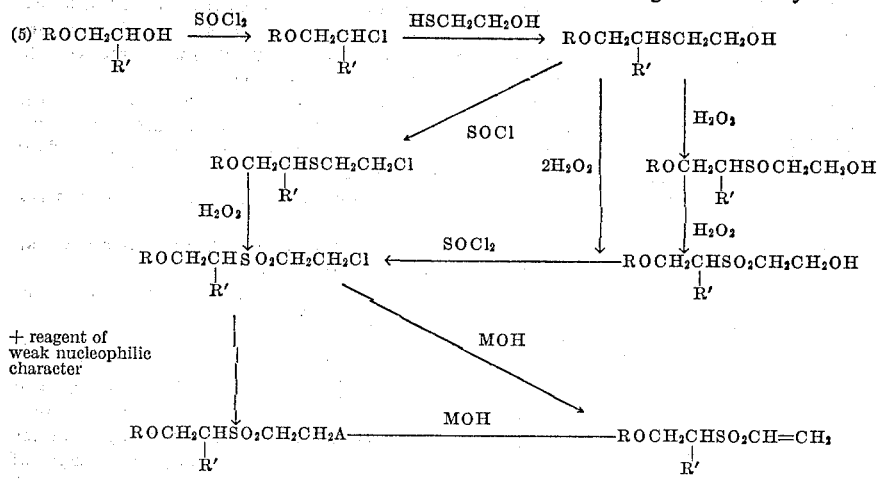

The cross-linking reaction of the unsymmetrical difunctional compounds, such as those of Formulas III and IV, with polymeric materials, and more particularly with cellulose, can be carried out in two distinct and completely controllable steps. In the first step, the group $$-SO_2CH=CH_2$$

or, alernatively, —SO$_2$CH$_2$CH$_2$A, is reacted at ambient temperatures in the presence of an aqueous alkali to form a side chain on the polymer. In the case of cellulose, some cellulose molecules are converted to a cellulose ether having the formula:

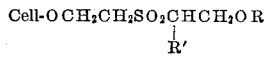

This ether can then be reacted with another cellulose molecule in a separate step to form a cross-linked product as shown by the following equation:

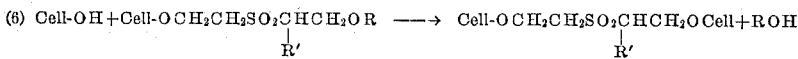

The foregoing reaction can be carried out at temperatues of about 100° C. or higher in the presence of a mild alkaline catalyst under conditions which allow the removal of the byproduct molecule ROH by evaporation (when R is either hydrogen or lower alkyl) or by neutralization (when R is acyl).

Also included among the novel compounds of the invention are following:

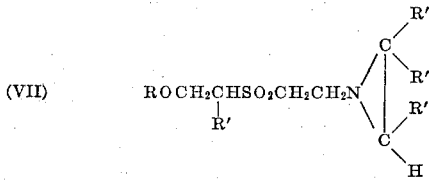

in which R is selected from the group consisting of hydrogen, lower alkyl and lower acyl, R' is a member selected from the group consisting of hydrogen and lower alkyl. The compounds of Formula VII can be prepared either from the compounds of Formula III by addition of a three-membered heterocyclic imino compound as shown by way of example in Equation 7,

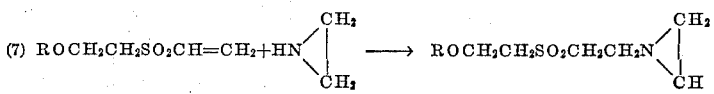

or they can also be prepared by reacting the corresponding beta-haloethyl sulfonyl compounds with three-membered heterocyclic imino compounds under suitable reaction conditions.

Further compounds included in generic Formula I are those corresponding to Formula VIII below.

(VIII)   ROCH$_2$CH$_2$CONHCH$_2$NHCOCH=CH$_2$ which can be obtained for example simply by the addition of one mole of alcohol to one mole of the symmetrical unsaturated compound N,N methylene bis acrylamide, and related compounds prepared in similar manner from bis acrylamides and bis vinyl sulfonamides of other bis secondary and bis primary amines.

Also included are unsymmetrical ketones such as those shown in Formulas IX and IX-a below.

(IX)   ROCH$_2$CH$_2$COCH$_2$COCH=CH$_2$ (IX-a)   ROCH$_2$CH$_2$COCH$_2$COCH$_2$CH$_2$A in which R and A have the meaning specified previously.

The unsymmetrical ketones of Formulas IX and IX-a can be prepared for example as shown in Equation 8.

(8)   ROH + CH$_2$=CHCOCH$_3$

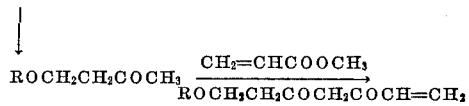

The vinyl compounds of Formulas VIII and IX can be converted to other new and useful unsymmetrical cross-linking agents by a reaction with three-membered heterocyclic imino compounds analogous to the reaction shown in Equation 7 for the unsymmetrical sulfone compounds.

Included among the compounds of generic Formula I are also unsymmetrical aziridinyl compounds corresponding to Formulas X and X-a

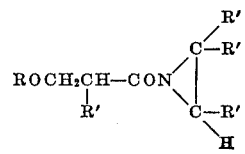

(X-a)

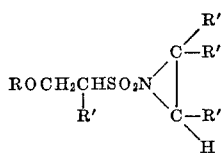

and prepared by reacting the cyclic imine with the appropriate acid halide as shown in Equations 9 and 10 (for the chloride) in the presence of a suitable acid acceptor.

(9)

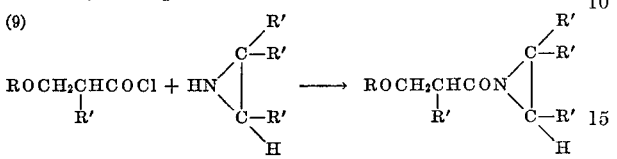

(10)

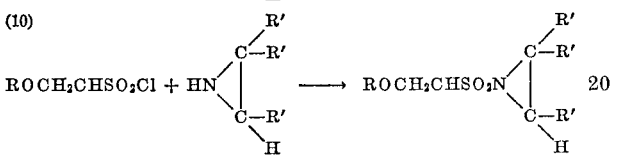

It is apparent from the above discussion that a large number of unsymmetrical reagents coming within the scope of the generic Formula I are included in the scope of the present invention. For some compounds, for example those in which the grouping R'' is

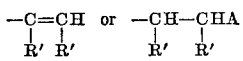

where A is the residue of a weak nucleophile, the two steps of the cross-linking process are both carried out under alkaline conditions, the first functional group being reacted in presence of water and second being reacted at elevated temperature under anhydrous conditions. For other compounds, for example those in which the grouping R'' is 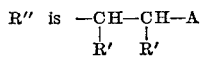

where A is aziridinyl

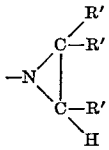

or those in which the grouping R'' is aziridinyl, the two steps of the cross-linking process are both carried out under essentially anhydrous conditions at elevated temperature, but one functional group is reacted under alkaline conditions, while the second is reacted under acidic conditions.

Thus, the processing conditions required to carry out the stepwise cross-linking employing the unsymmetrical reagents of the present invention depend on the chemical structure of the reagent selected.

The following examples are merely illustrative of the features of the invention, but are not to be considered limiting in any manner with respect to the scope of the invention.

Example 1.—Preparation of 2 chloroethyl
2' hydroxyethyl sulfone

154 grams (1 mol) of anyhydrous bis-(2 hydroxyethyl) sulfone were dissolved in 500 g. of dimethyl ether of ethylene glycol and 79 g. (1 mol) of pyridine were added thereto. 95 g. (0.8 mol) of thionyl chloride were then added with stirring and cooling. The temperature was maintained at 40–45° C. and the addition took 50 minutes. The mixture was then refluxed for 30 minutes at 82–85° C.

The reaction mixture was poured into water, and the organic phase was separated. The organic phase was then dried over Na$_2$SO$_4$ and the solvent was removed by distillation, leaving 66 grams of crude product in the form of a brown liquid.

*Analysis.*—Total chloride: 17.7% (determined by hydrolysis); free chloride: 2.48% (determined by AgNO$_3$ titration); bound chloride: 15.22% (by difference); calcd. chloride: 20.70%; purity of crude product: 74%.

Although higher yields of product could be obtained by increasing the mol ratio of SOCl to bis-(2 hydroxyethyl) sulfone, this resulted in contamination of the product by bis(2-chloroethyl) sulfone, which was separated with great difficulty. The product prepared by the procedure outlined in Example 1 on the other hand, was contaminated only by unreacted bis-(2 hyroxyethyl) sulfone which was readily removed in subsequent steps.

Example 2.—Preparation of 2 hydroxyethyl sulfonyl ethyl pyridinium chloride

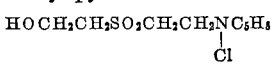

69 grams (0.4 mol) of 2 chloroethyl 2'hyroxyethyl sulfone, 28 grams (0.4 mol) of pyridine, and 150 grams of isopropanol were refluxed with stirring at 88–92° C. for 12 hours. A tan solid precipitated in the course of reaction, indicating that essentially all of the organic chloride which was present was converted to ionic chloride. The solvent layer was decanted, and the precipitate was washed with acetone and ether on a filter. 61 grams of light tan crystalline product were obtained.

*Analysis.*—Chloride found: 14.25% (by AgNO titration); calcd. chloride: 14.10%; Equivalent weight: Found—248; calcd.—251.5.

The equivalent weight was determined by electrometric titration with standard NaOH solution (end pt: pH 10.5).

Example 3.—Preparation of 2 methoxyethyl chloride

190 grams (2.5 mols) of 2 methoxyethanol and 216.7 grams (2.75 mols) of pyridine were diluted with 100 grams of ethylene glycol dimethyl ether. 327.8 grams (2.75 mols) of thionyl chloride were then added with stirring over a period of two hours. The temperature was maintained below 50° C. by means of a cooling bath. After addition of the SOCl$_2$ the mixture was heated to reflux and stirred at 80–85° C. for 30 minutes. The reaction mixture was poured on to 1000 g. of crushed ice and the water layer was separated. The organic layer was washed twice with 100 ml. of cold water, dried over Na$_2$SO$_4$ and distilled. B.P. 85–90° C. (at atmospheric pressure).

*Analysis.*—Bound chloride: 36.9%; calcd. chloride: 37.5%; purity: 98.5%.

The distillate weighed 214 grams, corresponding to a yield of 89.5% of the theoretical.

Example 4.—Preparation of 2 methoxyethyl 2' hydroxyethyl sulfide

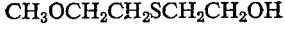

273 grams (3.5 mols) of 2-mercaptoethanol were added to 140 grams (3.5 mols) of sodium hydroxide dissolved in 300 grams of ethanol. 331 grams (3.5 mols) of 2 methoxyethyl chloride were added dropwise with stirring under a blanket of nitrogen over a period of 5 hours. The temperature was kept below 40° C. After the addition was completed, the mixture was stirred an additional 3 hours. The precipitated sodium chloride was filtered off, and ethanol and water were removed by stripping under reduced pressure. The product was then distilled. B.P.: 104–107° C. at 6 mm. The distillate was a colorless liquid.

*Analysis.*—Sulfur found: 23.2%; calcd. 23.5%. The distillate obtained weighed 381 grams, corresponding to a yield of 80% of the theoretical.

Example 5.—Preparation of 2 methoxyethyl 2′ hydroxyethyl sulfone $$CH_3OCH_2CH_2SO_2CH_2CH_2OH$$

200 grams (1.47 mols) of 2 methoxy-2′hydroxyethyl sulfide (product of Example 4) were charged in a reaction vessel, and 2 grams of 85% phosphoric acid were added. 137 grams (1.41 mols) of 35% equeous hydrogen peroxide were added dropwise with stirring over a period of 90 minutes and the temperature was maintained below 55° C. by means of a cooling bath. The mixture was then heated to reflux, and another portion of 137 grams of 35% hydrogen peroxide was added over a period of 60 minutes at 100–107° C. The mixture was then refluxed for 12 hours or until a test for residual hydrogen peroxide was negative. The water was removed under reduced pressure at 17 mm. to a pot temperature of 105° C.

The product was obtained as a light yellow liquid which weighed 200 grams and contained only a very small amount of oxidizable sulfur (0.25%). The yield was 89.5% of the theoretical.

Example 6.—Preparation of 2 methoxyethyl 2′ chloroethyl sulfone $$CH_3OCH_2CH_2SO_2CH_2CH_2Cl$$

50.4 grams (0.3 mol) of 2 methoxyethyl 2′ hydroxyethyl sulfone (product of Example 5) were dissolved in 29 grams (0.33 mol) of pyridine, and 43.5 grams (0.33 mol) of thionyl chloride were added dropwise while stirring, over a period of 60 minutes at a temperature not exceeding 40° C. The mixture was heated to 70° C. and kept at 70° C. for 30 minutes. After cooling to room temperature, the reaction mixture was poured on to a saturated sodium chloride solution (in water), and extracted with dimethyl ether of ethylene glycol three times using 100 ml. of the ether for each extraction. After separating and drying the organic phase, the solvent was removed under reduced pressure, and the residue was distilled. B.P.: 131–132° at 1.0 mm. The product was a pale yellow liquid obtained in 40% yield.

*Analysis.*—Bound chloride: found—18.9%; calcd.—19.05%. Methoxyl content: found—16.65; calcd.—16.62.

Example 7.—Preparation of 2 methoxyethyl sulfonyl ethyl pyridinium chloride $$\underset{\underset{Cl}{|}}{CH_3OCH_2CH_2SO_2CH_2CH_2NC_5H_5}$$

200 grams (1.07 mols) of 2 methoxyethyl-2′-chloroethyl sulfone (product of Example 6) were mixed with 250 grams of isopropanol and 85 grams (1.07 mols) of pyridine, and refluxed for 6 hours at 80–90° C., at which time essentially all of the organic chloride present was converted to ionic chloride. This isopropanol was removed under reduced pressure, and the crystalline residue was washed with acetone and ether on a filter.

The weight of the white crystalline product so obtained was 262.8 grams, corresponding to a yield of 91% of the theoretical.

*Analysis.*—Chloride content: found—12.2%; calcd.—13.3%. Equivalent weight: found—288; calcd. 266.5.

The equivalent weight was determined by electrometric titration with a standard NaOH solution.

Example 8.—Preparation of 2 methoxyethyl, 2′-thiosulfatoethyl sulfone $$CH_3OCH_2CH_2SO_2CH_2CH_2SSO_3Na$$

93.2 grams (0.5 mol) of 2 methoxyethyl 2′-chloroethyl sulfone (product of Example 6) were mixed with 93 grams of ethanol, and a solution of 124 grams (0.5 mol) of sodium thiosulfate pentahydrate in 124 grams of water was added. The mixture so obtained was refluxed with stirring for 4 hours, until essentially all of the organic chloride was converted to ionic chloride. The reflux temperature of the mixture was 80–90° C. After the refluxing, 100% conversion was achieved, as indicated by titration for free thiosulfate ion. The reaction product was not isolated in crystalline form, but the ethanol was distilled off and the residual aqueous solution was analyzed as follows:

Calculated concentration of product from the weight of aqueous solution obtained: 42.8%.

Concentration determined from the amount of sodium hydroxide consumed in alkaline hydrolysis: 43.1%.

Concentration determined from the amount of sodium thiosulfate liberated in alkaline hydrolysis with sodium hydroxide: 39.9%.

Example 9.—Preparation of 2 methoxyethyl vinyl sulfone $$CH_3OCH_2CH_2SO_2CH=CH_2$$

46.6 g. (0.25 mol) of 2 methoxyethyl 2′ chloroethyl sulfone (product of Example 6) were added dropwise with continuous stirring to a solution containing 26.0 g. (0.25 mol) of triethylamine and 100 g. of ethylene glycol dimethyl ether. External cooling was necessary in order to maintain the temperature at 25°–30° C. The addition required 40 minutes. An additional hour of stirring at room temperature was necessary to reach 80% conversion after the addition of the chloride was completed. The triethylamine hydrochloride which precipitated was filtered off and the solvent was removed under reduced pressure. The residue was vacuum distilled. B.P.: 96–98° C. at 1 mm. Yield of distilled product: 29.0 g. corresponding to 77.5% of the theoretical. $n_D^{20}=1.4659$. Vinyl content: 17.85% (calcd.: 18.0%)

Example 10.—Preparation of 2 methoxyethyl 2′ aziridino ethyl sulfone

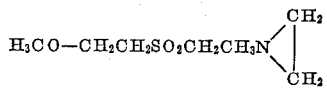

29.0 g. (0.19 mol) of 2 methoxyethyl vinyl sulfone (product of Example 9) were added to 13.2 g. (0.3 mol) of ethylene imine keeping the temperature at 29–30° C. by cooling with an ice bath. The time of the addition was 25 minutes, and stirring for 60 minutes at room temperature after completing the addition was sufficient to achieve complete reaction. The excess ethylene imine was distilled off and the residual yellow liquid weighed 35.1 g. The equivalent weight determined by titration with standard acid was 208 (calcd.: 193). The equivalent weight determined by thiosulfate titration (described in JACS 77, 5918–22 (1955)) was 211. The yield of product was 88.6% of the theoretical.

Example 10–A.—Preparation of 2-methoxypropionamidomethyl acrylamide $$CH_3OCH_2CH_2COHNCH_2NHCOCH=CH_2$$

42.1 g. of 60% aqueous N-methylolacrylamide (0.25 mol) and 14.0 g. of 37% aqueous HCl were added dropwise at room temperature to a solution of 51.5 g. of 2-methoxypropionamide (0.5 mol) in 50 g. of water. The mixture was then stirred for 1 hour, and allowed to stand at room temperature overnight. The reaction mixture was then cooled to 5° C. and neutralized to pH 6.0 by the gradual addition of $Na_2CO_3$. The white crystalline precipitate formed was filtered, and twice recrystallized from isopropanol. M.P. 155°–157° C. Vinyl content (determined by dodecyl mercaptan titration) 13.65% (calcd. 14.55%); methoxyl content 17.05% (calcd. 16.65%); nitrogen content 15.22% (calcd. 15.05%). Mixed M.P. with methylene bis acrylamide: 98–110° C. Mixed M.P. with methylene bis methoxypropionamide (M.P. 146°–149° C.) 125°–135° C.

The foregoing are merely illustrative of the processes whereby the new and novel compounds of the invention may be formed. The reaction conditions will vary depending upon the particular compound to be produced.

Thus, in Examples 2, 7 and 8 the reaction occurs at a temperature of from 80 to 90° C. in a period of from 4–12 hours and the reactants are present in equimolar proportions. In Example 10, on the other hand, the imine is present in excess and the reaction is conducted at low temperatures of 29–30° C. and then completed at room temperature. Variations in temperatures and times will be readily apparent.

Whereas the chlorine derivative is utilized as an intermediate in several of the foregoing examples, it is to be understood that any of the halogen derivatives will operate satisfactorily.

Example 11.—Reactions of 2-hydroxyethyl sulfonyl ethyl pyridinium chloride (product of Example 2) with cotton fabric (A) A sample of cotton fabric (known as 80 x 80 print cloth) was impregnated with a 25% aqueous solution of the product of Example 2 on a laboratory padder, setting the rolls at such a pressure as to give a 100% wet pickup. 0.25 gram of reagent was thus deposited on each gram of cotton fabric. The impregnated fabric was framed to the original dimensions and dried in a forced draft oven at 80–90° C., then treated by padding with a 5.5% sodium hydroxide solution. The amount of NaOH solution picked up by the fabric was such (76%) as to yield a 1.04 mols ratio of NaOH to reagent on the fabric. The fabric was rolled and allowed to stand wet at room temperature for 60 minutes, care being taken to prevent evaporation of water by covering the roll with poly-ethylene or other non-porous material. The fabric was rinsed with 1% acetic acid to neutralize residual NaOH, and washed at 60–70° C. The reaction described yielded a 3.6% increase in fabric weight, forming the product

Cell-OCH$_2$CH$_2$SO$_2$CH$_2$CH$_2$OH

The sulfur content of the fabric so treated was equivalent to the observed weight increase. The physical properties of the treated cotton fabric (crease recovery, tensile strength, tear strength) were essentially identical with those of the untreated fabric, since in the modification of the fiber only one reactive grouping of the reagent was involved and side chains were introduced without incipient cross-linking or formation of a three-dimensional network.

(B) The second reactive grouping (beta-oxyethyl-sulfonyl) of the modified cotton product described in Example 11(A) could be reacted with the residual unmodified cellulose molecules by the procedure described below. The modified cotton fabric prepared in Example 11(A) was impregnated by padding with a 0.5% aqueous solution of potassium bicarbonate, dried at 80–90° C., then cured for 3 minutes at 150° C., washed and dried. The catalyzed heating step efficiently effected cross-linking, as shown for example by the following changes in physical properties:

TABLE I

| | Untreated control | Before heating (Product of Example 11A) | After heating (Product of Example 11B) |
|---|---|---|---|
| Dry crease recovery angle (W+F) | 175 | 170 | 245 |
| Wet crease recovery angle (W+F) | 169 | 190 | 249 |

The crease recovery angle was determined by the method described in the Technical Manual of the American Association of Textile Chemists and Colorists, 1960 edition, pp. 165–167, Tentative Test Method 66–1959, ASTM designation D 1295–53T.

It is apparent from the results given above that the properties of the cotton fabric (as illustrated for example by the crease recovery angle) were not significantly altered by the first step (A) of the reaction, while they were greatly improved by the cross-linking reaction which took place in the second step (B).

Example 12.—Reactions of 2 methoxyethyl sulfonyl ethyl pyridinium chloride (product of Example 7) with cotton fabric (A) Samples of 80 x 80 print cloth were padded with 40 to 20% solutions of the reagent to give 36.6 and 18.4% reagent, based on the weight of the dry fabric, respectively. The mol ratio of NaOH to reagent was thus 1.19 and 1.18 respectively. The samples were rolled, wrapped in polyethylene sheeting and allowed to stand at room temperature for 30 minutes. After the reaction was completed, the fabrics were rinsed in a 1% acetic acid solution then washed in a detergent solution at 60–70° C., rinsed in cold water, dried, conditioned and weighed analytically to determine the weight increase due to treatment.

(B) The physical properties of the fabrics were determined and then the fabrics were aftertreated with a 3% solution of potassium bicarbonate, dried at 80° C. and cured for 3 minutes at 150° C. Routine rinse and wash followed the curing step and the changes in physical properties were determined.

The results obtained by the procedures described in 12(A) and 12(B) are summarized below.

TABLE II

| Reagent concentration, percent based on weight of fabric | Untreated control | Before heating, Example 12(A) | | After heating Example 12(B) | |
|---|---|---|---|---|---|
| | 0 | 36.6 | 18.4 | 36.6 | 18.4 |
| Weight increase | 0 | 6.5 | 2.6 | | |
| Dry crease recovery angle (W+F) | 175 | 181 | 166 | 285 | 239 |
| Wet crease recovery angle (W+F) | 169 | 190 | 181 | 290 | 240 |
| Warp tensile strength, lbs | 56 | 55 | 56 | 27 | 39 |
| Warp tear strength, lbs | 1.6 | 1.5 | 1.6 | 0.9 | 1.1 |

It is again apparent that the introduction of side chains does not change the properties of the fabric significantly either for low (2.6%) or relatively high (6.5%) weight increases, while the cross-linking step produces massive changes in fabric properties, the changes being proportional to the number of side chains present (as indicated by the weight increase) and capable of entering into the cross-linking reaction.

Example 13.—Reactions of 2 methoxyethyl thiosulfato-ethyl sulfone (product of Example 8) with cotton fabric (A) A sample of 80 x 80 cotton print cloth was padded with an aqueous solution of the reagent to give 0.2 gram of reagent per gram of fabric, and dried at 80–90° C. The fabric was then padded with a 4% NaOH solution at 75.5% wet pickup, giving 0.03 gram of NaOH per gram of fabric. This was equivalent to 1.08 mols of NaOH per mol of reagent. The wet fabric was rolled, wrapped in polyethylene sheeting and allowed to stand for 30 minutes at room temperature. After this reaction period, the fabric was rinsed in a 1% solution of acetic acid, then washed in detergent solution at 60–70° C., rinsed in water, dried, conditioned and weighed to determine the weight increase.

(B) The physical properties of the fabric were determined and the fabric was then treated with a 3% solution of potassium bicarbonate, dried at 80–90° C., cured for 3 minutes at 150° C. and washed. The change in physical properties resulting from treatments (A) and (B) was as follows:

TABLE III

|  | Before heating, Example 13(A) | After heating, Example 13(B) |
|---|---|---|
| 5% weight increase over untreated | 3.15 |  |
| Dry crease recovery angle (W+F) | 171 | 244 |
| Wet crease recovery angle (W+F) | 180 | 246 |
| Warp tensile strength (lbs.) | 59 | 39 |
| Warp tear strength (lbs.) | 1.6 | 1.0 |

Example 14.—Reactions of 2 methoxyethyl 2' thiosulfatoethyl sulfone (product of Example 8) with regenerated cellulose (rayon) fabric (A) A sample of viscose rayon fabric was padded with an aqueous solution of the reagent to give 0.2 gram of reagent per gram of fabric, and dried at 80–90° C. The fabric was then treated with a 4.7% solution of poassium hydroxide at 95% wet pickup, giving a 1.15 mol ratio of KOH to reagent on the fabric. The fabric was rolled, wrapped in polyethylene sheeting and allowed to stand wet at room temperature for 30 minutes. It was then neutralized in 1% acetic acid, washed, dried, conditioned and weighed.

(B) The physical properties were determined, and the fabric was then treated with a 1% solution of potassium bicarbonate, dried at 80–90° C., and cured for 3 minutes at 150° C. After washing, the change in physical properties resulting from cross-linking was determined. The changes in physical properties were essentially nil after step (A), but very considerable after step (B).

Example 15.—Reactions of 2-methoxyethyl sulfonylethyl pyridinium chloride (product of Example 7) with regenerated cellulose When the procedures of Example 14 were repeated, employing the product of Example 7 instead of the product of Example 8, the following results were obtained:

TABLE IV

|  | Untreated Rayon | Before heating Example 15(A) | After heating Example 15(B) |
|---|---|---|---|
| Percent weight increase | 0 | 7.4 |  |
| Percent sulfur content | 0 | 1.9 | 1.9 |
| Percent methoxyl content | 0 | 1.8 |  |
| Dry crease recovery angle (W+F) | 203 | 188 | 220 |
| Wet crease recovery angle (W+F) | 181 | 182 | 278 |
| Warp tensile strength (lbs.) | 51 | 43 | 31 |
| Warp tear strength (lbs.) | 3.2 | 2.1 | 1.2 |

Example 16.—Reactions of 2-methoxyethyl 2'aziridinoethyl sulfone (product of Example 10) with cotton fabric Samples of 80 x 80 cotton print cloth were padded with the following aqueous solutions on a laboratory padder:

Solution (A) containing 15% of the product of Example 10 +3.9% KHCO₃
Solution (B) containing 15% of the product of Example 10 +7.8% KHCO₃
Solution (C) containing 7.5% of the product of Example 10 +3.9% KHCO₃

The wet pickup was 95% for solutions (A) and (B) and 88% for solution (C) corresponding to 14.2 and 6.6% reagent respectively (based on the weight of the fabric). The samples were dried at 50° C. and cured for 3 minutes at 150° C., then thoroughly washed with distilled water. The weight increase for the above samples was: for sample (A), 7.9% (67% yield); (B), 7.4%; and (C), 4.0% (73% yield). After this treatment the cellulose contained the side chain reaction product

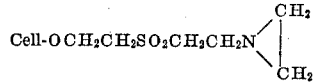

Cross-links were formed by treating portions of samples (A) and (C) with 0.8% and 0.4% solutions of zinc fluoroborate respectively, drying at 80° C., curing for 5 minutes at 150° C., and washing. The acid catalyzed step induced opening of the aziridine ring, and formation of a cross-linked product

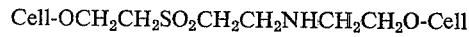

which exhibited greatly enhanced crease recovery over the side chain reaction product formed in the alkali catalyzed first step.

Example 17.—Reactions of 2-methoxyethyl sulfonyl ethyl pyridinium chloride (product of Example 7) with cotton and rayon (A) Cotton yarn skeins were padded with a 25% aqueous solution of a methoxyethyl sulfonyl ethyl pyridinium chloride (the product of Example 7) to give 19.95% reagent based on the weight of yarn. After drying at 80–90° C., the skeins were padded with a 5% solution of NaOH to give 5.25% NaOH based on the weight of the yarn. The mol ratio of NaOH to reagent was thus 1.75. The skeins were wrapped in polyethylene sheeting and allowed to stand at room temperature for 30 minutes. They were then rinsed in 1% acetic acid and washed in a non-ionic detergent solution at 60–70° C., rinsed in cold water, conditioned and weighed analytically to determine the weight increase due to the treatment. The yarn skeins were knitted into tubing which was then padded with a 3% KHCO₃ solution, dried at 80° C. and cured for 3 minutes at 150° C. Routine rinse and wash followed the curing step and the changes in physical properties were determined.

(B) Rayon yarn skeins were padded with a 25% solution of methoxyethyl sulfonyl ethyl pyridinium chloride (product of Example 7). After drying at 80–90° C., the skeins were padded with a 6% solution of KOH. The mol ratio of KOH to reagent present on the yarn was 1.35. The skeins were wrapped in polyethylene sheeting and allowed to stand at room temperature for 30 minutes. After this reaction period, the skeins were rinsed in 1% acetic acid and washed in a non-ionic detergent solution at 60–70° C., rinsed, dried, and weighed analytically to determine the weight increase.

The treated skeins were knitted into tubing, padded with a 3% solution of KHCO₃, dried at 80° C., and cured for 3 minutes at 150° C. Routine rinse and wash followed the curing step and the changes in the physical properties of the yarn were determined.

The following table summarizes the changes in physical properties observed as a result of the treatments described in Examples 17(A) and 17(B)

TABLE V

| Yarn sample | Percent elongation | Tensile strength, grams |
|---|---|---|
| Cotton, untreated | 4.9 | 312 |
| Cotton, side chain reacted (Ex. 17(A) before knitting) | 5.0 | 278 |
| Cotton, cross-linked (Ex. 17(A) yarn from knitted cured fabric) | 3.7 | 188 |
| Rayon, untreated | 10.7 | 289 |
| Rayon side chain reacted (Ex. 17(B) before knitting) | 10.7 | 244 |
| Rayon, cross-linked (Ex. 17(B) yarn from knitted cured fabric) | 10.8 | 237 |

Example 18.—Reactions of 2-methoxyethyl sulfonyl ethyl pyridinium chloride (product of Example 7) with cotton (A) A sample of 1.5″ Pima cotton fiber was carded to give a web suitable for padding treatment. The web was encased in Dacron polyester sheeting and padded with a 25% solution of 2-methoxyethyl sulfonyl ethyl pyridinium chloride (product of Example 7) to give 45% reagent on the weight of fiber. After drying at 80–90° C. the web was padded with a 5% solution of NaOH to give 7.5% NaOH on the weight of the fiber. The mol ratio of NaOH to reagent present on the fiber was 1.1. The fiber sample was wrapped in polyethylene sheeting and allowed to stand at room temperature for 30 minutes. After this reaction period, the fiber web was rinsed in 1% acetic acid, then washed in warm water, rinsed and dried. The cotton fiber was processed without difficulty by carding again, drawing, spinning at 7500 r.p.m. and knitting. The knitted fabric so obtained was padded with a 3% solution of $KHCO_3$, dried at 80° C. and cured for 3 minutes at 150° C. Routine rinsing and washing followed the curing step, and the physical properties of the yarn manufactured from the treated fiber were determined before and after the cross-linking step which was carried out after knitting.

TABLE VI

| Sample | Percent elongation | Tensile strength, grams |
| --- | --- | --- |
| Cotton yarn prepared from untreated fiber (control) | 7.9 | 349 |
| Cotton yarn prepared from side chain reacted fiber (Ex. 18A) | 6.6 | 276 |
| Cotton yarn removed from knitted cured fabric (Ex. 18A) | 5.0 | 179 |

(B) An attempt was made to obtain results comparable to those outlined in Example 18(A) by cross-linking cotton fiber in a single step, and subsequently converting the treated fiber into yarn and knitted fabric. For this purpose, a sample of the same 1.5″ Pima cotton fiber used in Example 18(A) was carded to give a web suitable for padding treatment. The web was encased in Dacron polyester sheeting and padded with an aqueous solution containing 6% bis(beta hydroxyethyl) sulfone and 3.9% $KHCO_3$ as catalyst. 10% cross-linking agent was deposited based on the weight of the cotton fiber.

After drying at 80–90° C., the web was cured at 150° C. for 3 minutes. Routine rinse and wash followed the curing. An attempt was made to process the treated fiber sample into yarn and knitted fabric by the procedure described in Example 18(A). The carding did not present unusual difficulties, but the drawing resulted in an unsatisfactory web which had a flaky appearance from fibers dispersed throughout. Spinning of this web into yarn was extremely difficult. Even when the spindle speed was dropped from 7500 r.p.m. (which was the speed used in Example 18(A)) to 5500 r.p.m., the end would not stay up for any length of time. Some yarn was spun with great difficulty, but it was so weak that it could not be knitted.

The experiments described in Example 18 illustrated the great advantage of the invention, namely the possibility of introducing a cross-linking reagent into fiber, prior to processing, by reacting one functional group only, and without altering the behavior of the fiber in processing, and completing the cross-linking reaction at any desired stage in the manufacturing process.

Example 19

20.0 grams of corn starch (Corn Product Co., N.Y.) were added to a mixture of 180 grams of dioxane and 10 mls. of 5 N aqueous NaOH, and stirred at room temperature for 10 minutes. 2 grams of 2-methoxyethyl vinyl sulfone were added to the slurry and the mixture was stirred for 1 hour then allowed to stand overnight at room temperature. The slurry was filtered and the solid was dispersed in a mixture of 60 grams of dioxane, 30 grams of water and 10 grams of glacial acetic acid in order to neutralize the residual NaOH. After filtering, the solid was washed repeatedly with a dioxane-water mixture and dried. 1.0 gram of the modified starch product so obtained was easily dissolved in an aqueous NaOH solution (containing 8 g./liter of NaOH) at 100° C. The gelatinous mass formed was cast into a film which was dried at 50° C. for 30 minutes then cured for 8 minutes at 150° C. in order to effect cross-linking. The cured, cross-linked starch could no longer be dissolved in the aqueous NaOH solution (8 g./liter NaOH).

Example 20

20 grams of polyvinyl alcohol resin (marketed under the trade name of Elvanol 72–60 by E. I. du Pont de Nemours & Co.) were added to a mixture of 180 grams of dioxane and 10 mls. of 5 N aqueous NaOH, and stirred at room temperature for 10 minutes. 2 grams of 2-methoxyethyl vinyl sulfone were added to the resulting slurry, and the reaction mixture was stirred for 1 hour then allowed to stand overnight at room temperature. The slurry was filtered, and the solid was dispersed in a mixture of 60 grams of dioxane, 30 grams of water and 10 grams of glacial acetic acid in order to neutralize the residual NaOH. After filtering, the solid was washed repeatedly with a dioxane-water mixture and dried.

1 gram of the modified polyvinyl alcohol product so obtained was dissolved in a mixture of 9 grams of ethylene glycol and 9 grams of aqueous NaOH solution (containing 8 g./liter NaOH) at 109° C. A film was cast from this solution, dried at 60° C. for 2 hours and then cured for 8 minutes at 150° C. After the curing step, the modified (cross-linked) polyvinyl alcohol could no longer be dissolved in the ethylene glycol-aqueous NaOH mixture at 109° C.

As is evident from the above examples, the functional group RO— of the modifying or cross-linking agent of Formula I reacts with an active hydrogen of the polymers of polymeric material being treated, such as cellulose, at temperatures of about 100° C. or higher, while the R″ radicals

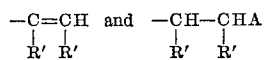

where A is a polar residue derived from a reagent of weak nucleophilic character, will react with an active hydrogen atom of the polymers at ambient temperatures usually under alkaline conditions. When the R″ radical of Formula I is either the aziridinyl group or the group

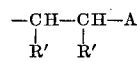

wherein A is an aziridinyl radical, the R″ radical will react with an active hydrogen of the polymers under acidic conditions. Thus, stepwise modification or cross-linking of the polymers is accomplished in any desired manner or sequence.

Furthermore, in Formula I, supra, it will be understood that the alkylene group includes methylene, ethylene, butylene, octylene, decamethylene, etc., while the aralkylene group includes —$CH_2C_6H_4CH_2$—,

—$C_2H_4C_6H_4C_2H_4$—

—$C_3H_6C_6H_4C_3H_6$—, —$CH_2C_6H_3(CH_3)CH_2$—, and the like.

We claim:
1. A compound having the formula

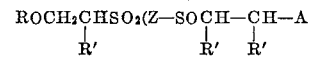

wherein

R is a member selected from the group consisting of hydrogen, lower alkyl and lower alkanoyl,
R′ is a member selected from the group consisting of hydrogen and lower alkyl,
Z is a bivalent organic radical selected from the group consisting of alkylene and phenalkylene,
n is 0 or 1, and
A is a quaternary ammonium group.

2. A compound having the formula

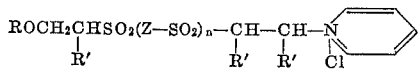

wherein

R is a member selected from the group consisting of hydrogen, lower alkyl and lower alkanoyl, R' is a member selected from the group consisting of hydrogen and lower alkyl, Z is a bivalent organic radical selected from the group consisting of alkylene and phenalkylene, and n is 0 or 1.

3.

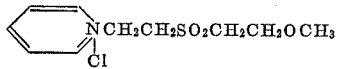

4.

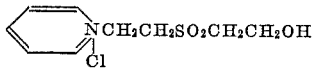

References Cited

UNITED STATES PATENTS

| | | | |
|---|---|---|---|
| 2,891,057 | 6/1959 | Porath | 260—231 |
| 3,022,288 | 2/1962 | Miller | 260—231 |
| 2,458,585 | 1/1949 | Friedman et al. | 260—294.8 |
| 2,761,866 | 9/1956 | Goldberg et al. | 260—294.8 |
| 2,897,223 | 7/1959 | Gaertner | 260—453 |
| 2,921,952 | 1/1960 | Doerr et al. | 260—453 |
| 2,858,341 | 10/1958 | Dole. | |
| 2,860,168 | 11/1958 | Erickson. | |
| 2,339,046 | 1/1944 | Bestian. | |
| 2,475,068 | 7/1949 | Wilson | 260—244.8 |
| 2,657,988 | 11/1953 | Fincke. | |

CHARLES B. PARKER, *Primary Examiner.*

D. R. PHILLIPS, *Assistant Examiner.*

U.S. Cl. X.R.

260—607, 593, 556, 561, 551, 239, 268, 453, 458, 231.
79.3: 8—116.2, 120; 252—8.7, 75

UNITED STATES PATENT OFFICE
CERTIFICATE OF CORRECTION

Patent No. 3,419,566                                    December 31, 1968

Andrew Oroszlan et al.

It is certified that error appears in the above identified patent and that said Letters Patent are hereby corrected as shown below:

Column 20, lines 61 to 64, the formula should appear as shown below:

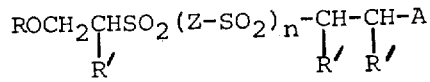

Signed and sealed this 17th day of March 1970.

(SEAL)
Attest:

Edward M. Fletcher, Jr.
Attesting Officer

WILLIAM E. SCHUYLER, JR.
Commissioner of Patents